United States Patent
Delbarre et al.

(10) Patent No.: US 6,719,163 B1
(45) Date of Patent: Apr. 13, 2004

(54) POLYMERIC FUEL CONTAINER

(75) Inventors: Pierre Delbarre, Ohlungen (FR); Michael Kloess, Karlsruhe (DE)

(73) Assignee: TI Group Automotive Systems Technology Center GmbH, Rastatt (DE)

(*) Notice: Subject to any disclaimer, the term of this patent is extended or adjusted under 35 U.S.C. 154(b) by 239 days.

(21) Appl. No.: 09/653,509

(22) Filed: Sep. 1, 2000

(30) Foreign Application Priority Data

Sep. 28, 1999 (DE) .......................................... 199 46 530

(51) Int. Cl.$^7$ .............................. B65D 6/28; B65D 90/08
(52) U.S. Cl. .................. 220/562; 220/4.14; 220/62.18; 220/62.22; 220/560.1
(58) Field of Search ........................ 220/62.18, 592.27, 220/592.25, 562, 563, 564, 586, 4.24, FOR 132, FOR 133, FOR 137, FOR 138, 678, 4.14, 62.22, 4.21, 560.1, 560.03, 4.13; 428/36.7, 36.6, 35.7

(56) References Cited

U.S. PATENT DOCUMENTS

| | | | | |
|---|---|---|---|---|
| 2,306,275 A | * | 12/1942 | Murray .................... | 244/135 R |
| 2,404,418 A | * | 7/1946 | Walker ....................... | 220/88.1 |
| 4,496,073 A | * | 1/1985 | Silver et al. ............ | 220/560.11 |
| 4,753,368 A | * | 6/1988 | Lescaut .................... | 220/62.22 |
| 5,072,623 A | * | 12/1991 | Hendershot ................ | 73/49.2 |
| 5,314,733 A | * | 5/1994 | Saito et al. ................. | 220/562 |
| 5,398,839 A | * | 3/1995 | Kleyn ....................... | 220/4.14 |
| 5,464,116 A | * | 11/1995 | Aoki et al. .................. | 220/586 |
| 5,547,096 A | * | 8/1996 | Kleyn ....................... | 220/4.14 |
| 6,033,749 A | * | 3/2000 | Hata et al. ................ | 206/524.1 |
| 6,047,747 A | * | 4/2000 | Bowen et al. .............. | 141/231 |
| 6,155,448 A | * | 12/2000 | Ishikawa et al. ............ | 220/562 |
| 6,391,412 B1 | * | 5/2002 | Hata et al. ................ | 206/524.1 |
| 6,395,357 B1 | * | 5/2002 | Abu-Isa ...................... | 428/35.4 |
| 6,398,059 B1 | * | 6/2002 | Hayashi et al. ............ | 220/4.13 |
| 6,409,040 B1 | * | 6/2002 | Distelhoff et al. ......... | 220/4.14 |
| 6,491,180 B2 | * | 12/2002 | Distelhoff et al. .......... | 220/562 |

FOREIGN PATENT DOCUMENTS

EP  1002682 A2 * 5/2000 ........... B60K/15/03

* cited by examiner

*Primary Examiner*—Lee Young
*Assistant Examiner*—Niki M. Eloshway
(74) *Attorney, Agent, or Firm*—Reising, Ethington, Barnes, Kisselle, P.C.

(57) ABSTRACT

A fuel container with a wall of at least two wall shells which are separated at least partially from each other by an air gap between them. The dual shell wall structure helps to substantially improve the mechanical properties of the fuel container. Preferably, each wall shell consists of a plurality of layers of different polymeric or plastic materials. In a preferred embodiment of the invention a four layer co-extruded structure is provided; each shell comprises a layer of high density polyethylene (HDPE), a layer of filler material of treated, recycled plastics material referred to as "re-grind" and a vapor barrier layer of a plastic material substantially impermeable by hydrocarbons. The HDPE-layer may, be one surface layer of each wall shell and the vapor barrier layer is preferably the other surface layer of each wall shell. Depending on the material properties of the vapor barrier layer, an additional adhesive layer may also be necessary for connection with the adjacent layer.

17 Claims, 2 Drawing Sheets

POLYMERIC FUEL CONTAINER

FIELD OF THE INVENTION

This invention relates to a fuel container, and more particularly to a fuel container of polymeric material preferably made by blow molding.

BACKGROUND OF THE INVENTION

In the automotive industry polymeric fuel containers are being used because they can be manufactured in a cost-efficient manner, are of high mechanical stability and readily deformable in accidents, and greatly inhibit permeation of hydrocarbons. The best results as to the overall qualities of the polymeric fuel containers have been obtained by a six-layer so-called COEX-structure. This is a multi-layer system manufactured in a single process (co-extrusion) and including two layers of high density polyethylene (HDPE) which enclose a barrier-layer of an ethylene vinyl alcohol copolymer (EVOH) and a layer of treated, recycled or "re-grind" plastic material. The EVOH-layer, which is not directly connectable to the HDPE, has an adhesive layer provided on both of its sides for connection to the adjacent layers so that the total structure comprises six layers. The layer of recycled or re-grind material is of a thickness which is about 35 to 45% of the total thickness of the fuel container wall and consists of a mixture of scrap materials resulting from the manufacturing of containers, i.e. it is both of HDPE and of EVOH. While HDPE is cheap and has good mechanical characteristics, it is a poor barrier against permeation of hydrocarbons. This is why the relatively thin EVOH-layer is used, which while being expensive, is an excellent barrier against permeation of hydrocarbons.

Presently, the State of California generally has the most stringent requirements for the reduction of total vehicle hydrocarbon emissions. As a general rule the other states in the U.S. and many other countries will adopt the Californian regulations after some time. Under the provisions of such future regulations the level of total vehicle hydrocarbon permeation must not exceed 0.5 g per day. To achieve this level, it has been estimated that the hydrocarbon emissions from the vehicle fuel system must not be more than 150 mg per day, which would result in a static permeation of less than 55 mg per day when production and durability parameters are considered. However, the fuel container is only a part of the total fuel system, and further estimates have shown that permeation through the container wall should not exceed 5 mg per day in order to meet the above requirements. The above described typical six-layer COEX-structure, however, only provides permeation levels of about 20 mg or less per day. One possibility to improve the performance of the six-layer COEX-structure would be to increase the thickness of the EVOH-layer from about 150 ηm to about 1.0 mm. Apart from substantially increased costs this would cause production problems and deteriorate the mechanical properties of the fuel container because EVOH has relatively poor impact resistance.

SUMMARY OF THE INVENTION

According to the present invention, a wall of a fuel container is formed of at least two wall shells which are separated from each other at least partially by an air gap. The dual wall structure helps to substantially improve the mechanical properties of the fuel container. Preferably, each wall shell consists of a plurality of layers of different polymeric or plastic materials. In a preferred embodiment of the invention a four layer co-extruded structure is provided; each wall shell comprises a layer of high density polyethylene (HDPE), a layer of filler material of treated, recycled plastics material referred to as "re-grind" and a vapor barrier layer of a plastic material substantially impermeable by hydrocarbons. The HDPE-layer may be one surface layer of each wall shell while, in contrast to prior art six-layer coextruded structures, the vapor barrier layer is preferably the other surface layer of each wall shell. Depending on the material properties of the vapor barrier layer, an additional adhesive layer may also be necessary for connection with the adjacent layer.

In a preferred embodiment of the invention, the vapor barrier layer of the inner wall shell forms the innermost layer of the fuel container and the vapor barrier layer of the outer wall shell forms the outermost layer of the fuel container.

In order to facilitate integration of further components of the fuel system into the fuel container, such as a fuel pump and fuel level indicator, it is desirable to form the container from two separately made wall halves welded together. If the vapor barrier layer of the inner wall shell faces the interior of the container, welding the two wall halves together will advantageously result in an integral, continuous vapor barrier layer so as to avoid a so-called permeation window. A preferred material of the vapor barrier layer is an ethylene vinyl alcohol copolymer (EVOH).

The total hydrocarbon emission can be substantially reduced by communicating the air gap between the wall shells to a suction discharge device for hydrocarbon vapors, which preferably includes an activated carbon filter and which feeds the hydrocarbon vapors either to the combustion chamber in the engine of the automotive vehicle or back into the interior of the container. A further advantage of the dual wall structure of the invention is improved thermal and acoustic insulation of the fuel within the container from the ambient as compared to prior art single-wall fuel containers. This also assists in reducing the permeation rates through the fuel container walls. A further improvement in this respect, which additionally improves the mechanical stability of the fuel container, is obtained when the air gap between the wall shells is filled at least partially by a foam of a preferably open cell plastic material.

To allow for assembly of fuel conduits and the like, the fuel container is provided with at least one container opening extending axially through the wall shells. For sealing purposes a substantially tubular duct element extending through the container opening can be used. The duct element is preferably formed of the same material as the vapor barrier layer. Because in the preferred embodiment the vapor barrier layer forms the innermost and outermost layers of the fuel container, the duct element may be readily welded to at least one of the barrier layers.

BRIEF DESCRIPTION OF THE DRAWINGS

These and other objects, features and advantages of this invention will be apparent from the following detailed description of the preferred embodiments and best mode, appended claims and accompanying drawings in which:

DETAILED DESCRIPTION OF THE PREFERRED EMBODIMENTS

Figure 1:
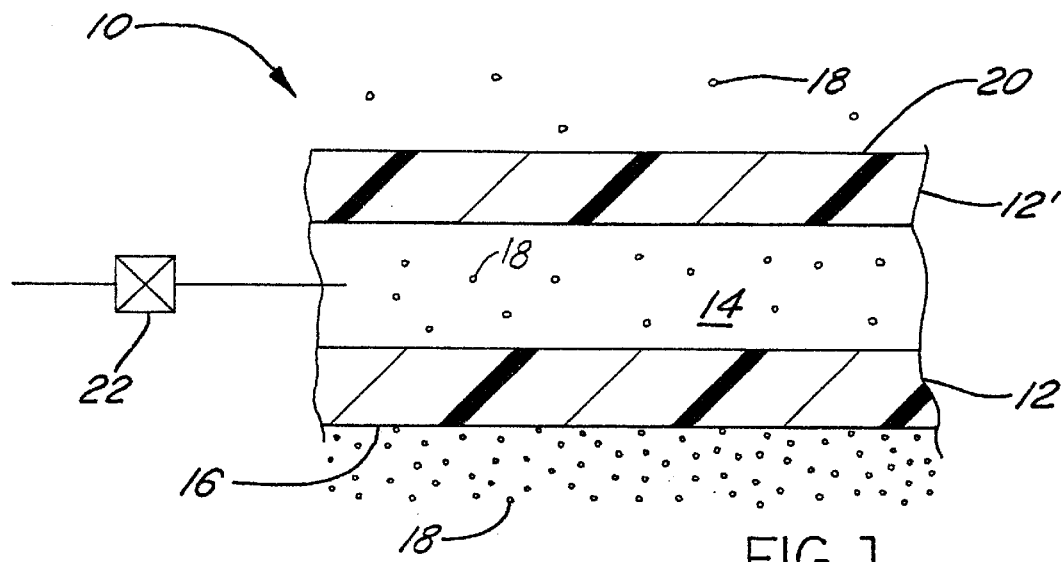
FIG. 1 is a cross-section through an area of the fuel container wall.

Referring in more detail to the drawings, FIG. 1 illustrates a portion of a fuel container wall 10 according to the present invention having inner and outer wall shells 12, 12' which are separated from each other by an air gap 14. The inner surface 16 of the inner wall shell 12 faces the interior of the container in which fuel is received and wherein there is a high concentration of hydrocarbon molecules 18. The outer surface 20 of the outer wall shell 12' defines at least in part the outer surface of the fuel container. There is a high concentration gradient of hydrocarbon molecules 18 between the surface 16 of the inner wall shell 12 and the surface 20 of the outer wall shell 12' so that there will be permeation of hydrocarbon molecules 18 through the wall shells 12, 12' in accordance with Fick's Law. As schematically indicated in FIG. 1, the concentration of hydrocarbon molecules 18 in the air gap 14 is less than in the interior of the fuel container and still less on the outside of the fuel container. Communicating the air gap 14 to a hydrocarbon suction discharge device 22 permits withdrawal of substantially all the hydrocarbon molecules 18 which have diffused through the inner wall shell 12 before they may diffuse further through the outer wall shell 12' so that total permeation of hydrocarbon through the container wall 10 is extremely low and meets the most stringent emission requirements. Preferably, the device 22 is a fuel vapor canister containing activated carbon which receives and stores fuel vapor from the air gap 14 and feeds the fuel vapor to a combustion chamber of the operating engine or back into the interior of the container. Additionally, the dual wall shell structure with the air gap 14 provides improved thermal and acoustical insulation of the fuel in the container from the ambient compared to single wall fuel tanks.

Figure 2:
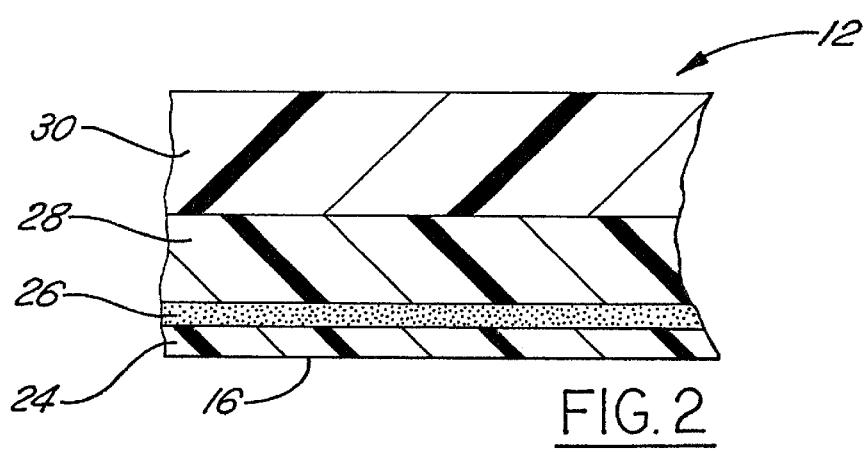
FIG. 2 is a cross-section through a wall shell consisting of four layers.

The layer structure of each wall shell 12, 12', which are preferably complementary to each other, is shown in FIG. 2. The inner surface 16 of the inner wall shell 12 facing the interior of the container is formed by a vapor barrier layer 24 of a polymeric or plastic material substantially impermeable by hydrocarbons, for example an ethylene vinyl alcohol copolymer (EVOH). The outer surface 20 of the outer wall shell 12', defining the exterior of the container, is also formed by a vapor barrier layer 24 of plastic material substantially impermeable by hydrocarbons, preferably EVOH. The vapor barrier layer 24 of each wall shell 12, 12' is connected or bonded by means of an adhesive layer 26 to a layer 28 of treated recycled plastic material, the so-called "re-grind" layer. This "re-grind" material consists of a mixture of all the waste or scrap plastic materials used in the manufacture of the fuel container, which are recycled to reduce waste and the cost to manufacture the fuel containers. The fourth layer 30 preferably consists of a pure high density polyethylene (HDPE) which, while being a relatively poor barrier to permeation of hydrocarbons, has excellent mechanical qualities.

Figure 3:
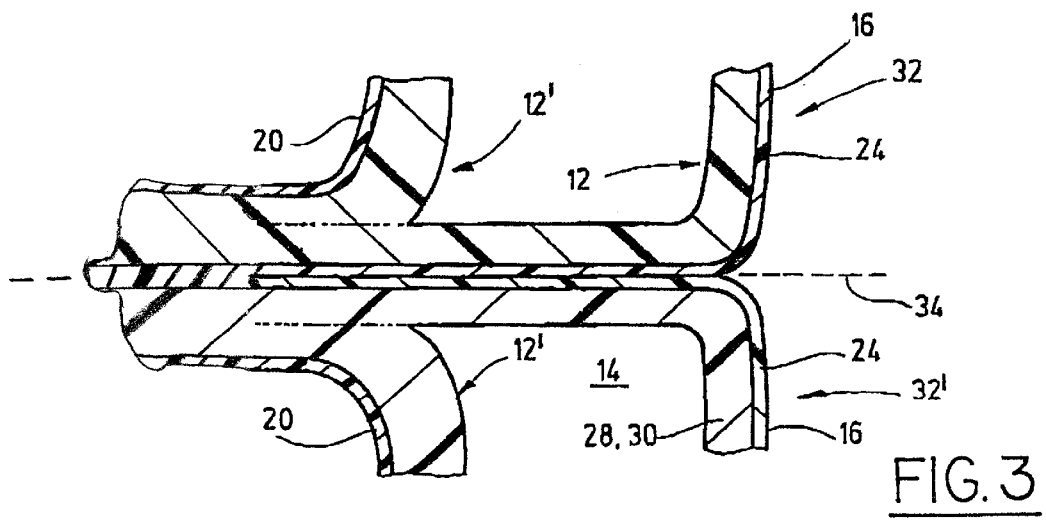
FIG. 3 is a cross-section through a wall shell in the area where two wall halves have been welded together.

The fuel container is made up of two separately manufactured wall halves 32, 32' (see FIG. 3) which are welded together after assembly of further components of the fuel system, such as a fuel pump and fuel level indicator, within the tank. FIG. 3 shows a detail of the area of the two wall halves which are welded together by pinching under heat, the so-called "pinch-off". In the prior art six-layer, single shell fuel containers the barrier layer of EVOH was covered on both sides by layers of HDPE or "regrind". This resulted, when two wall halves were welded together, in a gap in the barrier layer of EVOH which formed a so-called permeation window. In the embodiment as shown in FIG. 3, this is avoided by disposing the vapor barrier layer 24 on the outside of the wall shells 12, 12' with additional layers of material on only one side of the barrier layer 24. As shown in FIG. 3, when the walls 12, 12' are constructed in this manner, a continuous vapor barrier layer 24 results when the two wall halves are welded together. The welding seam between the two wall halves is indicated by the dotted line 34 in FIG. 3 where it can be seen that the vapor barrier layer 24 is at least essentially continuous in the area of the weld 34.

Figure 4A:
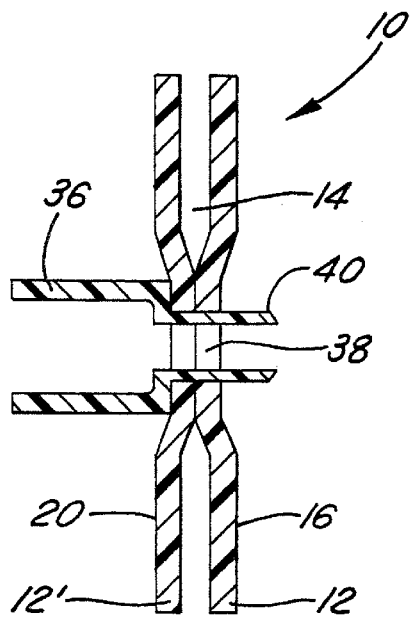
FIGS. 4a and 4b are schematic representations of an opening through the container wall.
Figure 4B:
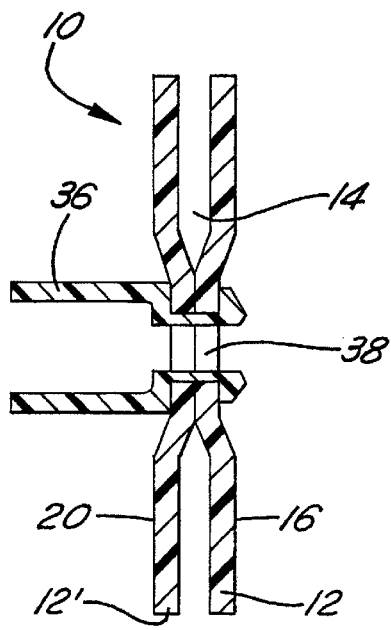

Fuel conduits or electrical wires require openings extending through the container wall 10. FIGS. 4a and 4b show an embodiment of a substantially tubular duct element 36 which extends through a container opening 38. As shown in FIG. 4a, the end 40 of the duct element 36 inserted into the interior of the container is crimped to form a flange, as shown in FIG. 4b, and is welded to the vapor barrier layer 24 of the inner wall shell 12 by an ultrasonic welding method. The duct element 36 is preferably made of the same material as the vapor barrier layer 24, for example EVOH, so that they may be welded together and to provide a barrier layer which is continuous except for the passage through the duct element 36.

Figure 5A:
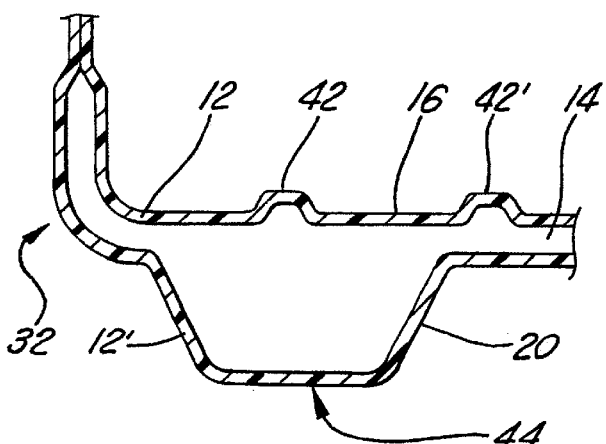
FIGS. 5a and 5b are schematic cross-sectional views of an area of a wall half without and with a foam disposed in the air gap between inner and outer wall shells.
Figure 5B:
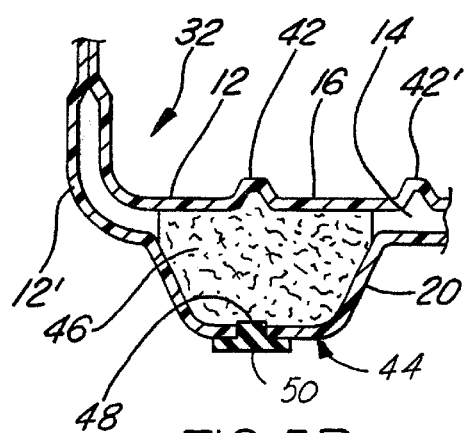

FIGS. 5a and 5b each show a portion of a wall half 32. The wall shells 12, 12' are preferably provided with stiffening ribs 42, 42' and a deformation 44 to increase the mechanical stability or to have the outer shape of the fuel container meet structural requirements of the vehicle. In the embodiment of FIG. 5b the air gap 14 is filled by a plastic foam material 46 in the area of the deformation 44 which is preferably an open-cell type foam material. This will result in even better thermal and acoustic insulation and further increase the mechanical strength and stability of the fuel container. To enable the air gap 14 to be filled by a foam material 46, the outer wall shell 12' is provided with an opening 48 which will be closed by a plug 50 after the foaming operation. The plug 50 is preferably formed of the same material as the vapor barrier layer 24 so that it can be connected to the vapor barrier layer 24 on the external side 20 of the wall shell 12' by welding the same materials. This again will result in an essentially continuous vapor barrier layer 24.

Therefore, the invention relates to a fuel container, such as for automotive vehicles, comprising a container wall 10 of thermoplastic materials preferably made by blow molding. To improve the mechanically stability and in particular the permeation characteristics thereof, the invention provides that the container wall 10 consists of at least two wall shells 12, 12' which are separated from each other at least partially by an air gap 14. Additionally, a vapor barrier layer 24 of each shell 12, 12' is preferably bordered by adjacent layers of material on only one side to provide an essentially continuous vapor barrier layer when two wall halves 32 are welded together to form the fuel container.

What is claimed is:

1. A fuel container for automotive vehicles, comprising: a first container wall half, a separate second container wall half, each wall half formed of polymeric material and having at least two wall shells each of polymeric material and which are separated at least partially from each other by an air gap between them throughout at least a majority of the surface area of the wall half and defining at least one fuel vapor chamber between the two wall shells, a separate substantially continuous layer of polymeric material substantially impermeable by hydrocarbons, exposed to the interior of the container and adhered to one side and over substantially all of the surface area of each wall shell adjacent the interior of the container, the shells of each wall half bonded together continuously about their peripheries and the first and second wall halves bonded together continuously about their peripheries with the layers of polymeric material impermeable by hydrocarbons adjacent the interior of the container fused together continuously about their peripheries to provide an essentially continuous vapor barrier layer on the interior of the container.

2. The fuel container according to claim 1, wherein each wall shell consists of a plurality of layers of different plastic materials.

3. The fuel container according to claim 2 wherein each wall shell comprises a layer of high density polyethylene, a layer of re-grind material and a layer of plastic material substantially impermeable by hydrocarbons.

4. The fuel container according to claim 3, wherein the layer of high density polyethylene defines one surface layer of each wall shell and the layer of plastic material substantially impermeable by hydrocarbons defines the other surface layer of each wall shell.

5. The fuel container according to claim 3 wherein the layer of plastic material substantially impermeable by hydrocarbons is connected to the re-grind material layer by an adhesive layer.

6. The fuel container according to claim 3 wherein the wall shells define an inner wall shell and an outer wall shell with the layer of plastic material substantially impermeable by hydrocarbons of the inner wall shell disposed facing the interior of the container and the layer of plastic material substantially impermeable by hydrocarbons of the outer wall shell defining the external surface of the container.

7. The fuel container according to claim 3 wherein the layer of plastic material substantially impermeable by hydrocarbons is formed of an ethylene vinyl alcohol copolymer.

8. The fuel container according to claim 1 wherein the container wall consists of two separately made wall halves welded together with each wall half defining a portion of each wall shell.

9. The fuel container according to claim 8 wherein the wall shells define an inner wall shell and an outer wall shell, and in the inner wall shell the layer of plastic material substantially impermeable by hydrocarbons is at least substantially continuous in the area of the weld between the wall halves.

10. The fuel container according to claim 1 wherein the fuel vapor chambers between the wall shells communicate with a discharge device for hydrocarbon vapors.

11. The fuel container according to claim 10 wherein the discharge device comprises a fuel vapor canister containing activated carbon.

12. The fuel container according to claim 1 wherein the air gap between the wall shells of at least one wall half is filled at least partially by a foam material bearing on the two wall shells to increase the structural strength of the wall half containing the foam material.

13. The fuel container according to claim 1 which also comprises at least one container opening extending through the wall shells.

14. The fuel container according to claim 13 which also comprises a duct element connected to at least one wall shell and extending through the container opening.

15. The fuel container according to claim 14 wherein the duct element is made of the same material as the layer substantially impermeable by hydrocarbons.

16. The fuel container according to claim 15 wherein the duct element is welded to the layer substantially impermeable by hydrocarbons of at least one wall shell.

17. The fuel container according to claim 16 wherein the wall shells define an inner wall shell and an outer wall shell and the duct element is welded to the layer impermeable by hydrocarbons of at least the inner wall shell.

* * * * *